Aug. 20, 1957  E. J. HOLLAND ET AL  2,803,038
PELLETIZING APPARATUS
Filed Jan. 12, 1954
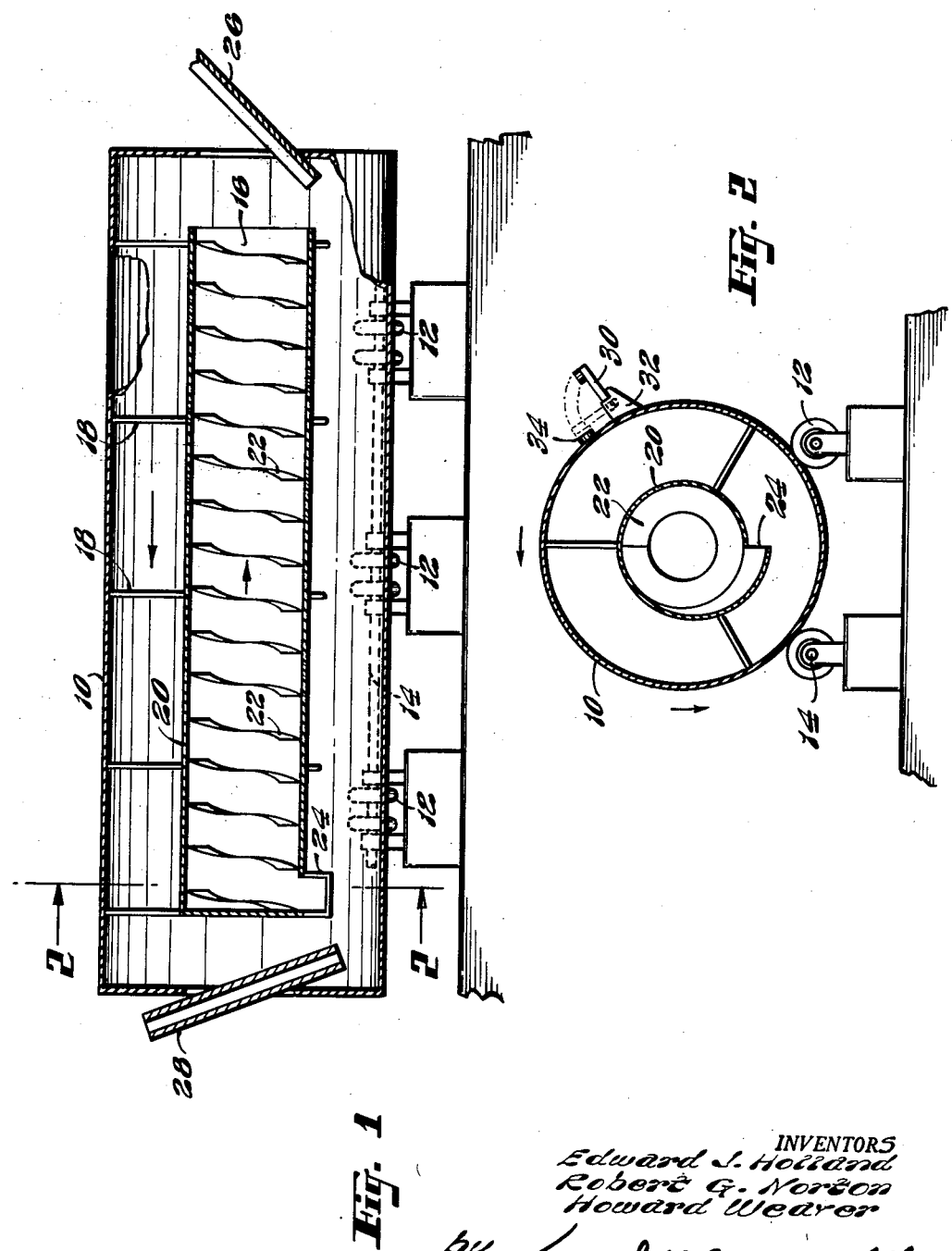
INVENTORS
Edward J. Holland
Robert G. Norton
Howard Weaver
by Kenneth W Brown, Atty

United States Patent Office 2,803,038
Patented Aug. 20, 1957

2,803,038
PELLETIZING APPARATUS

Edward J. Holland, Milledgeville, Ga., and Robert G. Norton and Howard Weaver, Pampa, Tex.

Application January 12, 1954, Serial No. 403,522

1 Claim. (Cl. 18—1)

This invention relates to the pelletization of finely divided materials and more particularly to a novel process and apparatus by which pellets may be recycled internally of the pelletizing drum to the inlet end thereof to furnish nuclei or seed for the pelletization of additional fluffy material.

It has been found that certain finely divided materials, notably the high structure carbon blacks, certain metal oxides and the like, resist agglomeration when agitated in a revolving drum. However, the discovery was made that when pellets previously formed were mixed near the inlet end of the drum with fresh fluffy material they served as uclei from which additional pellets would form from the available fluffy materials. Thus it has become the practice to recycle pellets in the ratio of from about ⅓ to 1 part pellets to 1 part fluffy material.

Heretofore recycle of pellets has been accomplished by conveying a portion of the pellets discharged from the drum to the opposite end by conventional means such as belt conveyors. The pellets are then introduced into the drum through its inlet, either separately or admixed with unpelletized material. Such method is obviously cumbersome and requires auxiliary apparatus.

Our invention makes possible the recycle of pellets within the drum and furthermore utilizes the rotation of the drum to convey the pellets from one end to the other.

Broadly stated our invention includes a process and apparatus by and in which pellets are scooped in controlled amounts from the pellet bed in the drum adjacent its discharge end and are conveyed to the opposite end thereof by rotation of an Archimedean screw conveyor mounted along the axis of the drum. The pellets may be discharged from the open outlet end of the screw and/or through openings in its side wall at appropriate points intermediate its ends. The volume of pellets picked up for recycle can readily be controlled by suitable sizing of the scoop attached to the screw and by regulation of the depth of the pellet bed in the drum.

It is the principal object of this invention to provide a process and apparatus for the dry pelletization of materials difficult to agglomerate.

It is a further object of this invention to provide a process and apparatus for seeding the dry pelletization of pulverulent materials with a portion of the product pellets in a closed system.

It is a further object of this invention to provide a continuous process for recycling pellets within a pelleting drum.

It is a further object of this invention to provide a pelletizer having novel means therein and integral therewith for conveying pellets formed therein from one end to the other.

Our invention will be better understood and appreciated from the following description thereof taken in connection with the accompanying drawings of a preferred embodiment thereof in which, Fig. 1 is a view in vertical cross section of one form of pelleting drum and internal conveyor, and Fig. 2 is a sectional end view thereof taken along line 1—1 of Fig. 1.

The apparatus comprises a metal drum 10 of suitable size, for example, 48 ft. long and 8 ft. in diameter, supported on rubber tired wheels 12 secured to rotatable shaft 14. Positioned along the axis of drum 10 and for the major portion of its length is Archimedean screw conveyor 16 attached to drum 10 by suitable means, as by radius arms 18 welded to the inner wall of the drum. Conveyor 16 comprises a metal cylinder 20 having attached to its inner wall a continuous helix 22 constructed from sheet metal or other suitable material extending for at least the major length of the cylinder. The conveyor is advantageously somewhat shorter in length than drum 10 but it may be of the same length if it is desired to support it on the end walls of the drum. At its upstream end, which is the downstream end for the pelletizing drum, conveyor 16 is provided with a scoop 24 extending beyond the periphery of the conveyor wall 20 and communicating with the interior thereof. The length of projection of the scoop 24 beyond the conveyor side wall is determined by the selected pellet bed depth in drum 10 and desired volume of recycle.

Pelleting drum 10 is provided with conventional means for supplying and discharging pellets. Thus one or more feed chutes or pipes 26 may extend into the drum through its inlet end and a discharge chute 28 may be secured in the outlet end in such a manner that pellets will be picked up and discharged in the course of each revolution of drum 10. Alternatively, screw conveyors may be mounted in the inlet end as shown, for example, in U. S. Patent No. 2,503,361, Studebaker, and the outlet end wall may be provided with adjustable outlet ports, likewise as shown in that patent.

Conveyor 16 may be open at its discharge end as shown in Fig. 1 and/or it may have one or more openings in its side wall at points intermediate its ends to deliver pellets at any desired point or points along the length of the drum.

As the material undergoing agglomeration often tends to stick to the side walls of drum 10, it is necessary to provide means such as scrapers to remove it. Another convenient means for recovering the adhering material is to provide a plurality of hammers 30 (one only shown) pivoted on a bracket 32 attached to the outer wall of the drum and anvils 34 likewise attached to the wall on which the hammers are arranged to strike upon each revolution of the drum.

The process of this invention is carried out in the illustrated apparatus as follows. Drum 10 is rotated by power transmitted through axle 14 and wheels 12 from a suitable source of power (not shown). Fluffy raw material is introduced into the drum 10 through chute 26 and is agglomerated in the course of its travel through the drum. Seed pellets previously produced can initially be introduced with the fluffy material or the rate of raw material flow can at first be limited sufficiently that the material will agglomerate by itself. As soon as a bed of pellets of suitable depth has formed a portion will be picked up by scoop 24 which will be conveyed to the inlet end of the drum. When pellet recycle is established the rate of fluffy raw material flow can be increased to working level.

It will thus be appreciated that we have provided a continuous, self-sustaining process which, by suitable sizing of component parts will provide regular and uniform production of excellent pellets, and with a minimum of moving parts. Further this invention makes it possible to provide pellet recycle without the use of cumbersome means, such as the conveyor and pellet divider shown in the Studebaker patent referred to above, for separating and returning a portion of the pellets to the pelletizer.

Having thus described our invention, we claim:

Apparatus for producing pellets of a finely divided material difficult to agglomerate comprising an elongated drum substantially unobstructed in the peripheral zone thereof mounted for rotation, an inlet therein and an outlet therefrom, an Archimedean screw conveyor having an imperforate cylindrical shell with an inlet opening at one end and an outlet opening at the other end, said conveyor being secured along the axis of said drum and arranged to convey material in a direction countercurrent to the direction of flow of material in the drum, a scoop depending from said conveyor at its inlet end and communicating with the interior thereof, at least one discharge opening in the conveyor adjacent the inlet end of the drum, means to introduce such finely divided material in the fluffy state into the inlet end of the drum and to discharge such material in pellet form from the outlet end thereof and, means to revolve the drum.

References Cited in the file of this patent

UNITED STATES PATENTS

| | | |
|---|---|---|
| 888,685 | Arnold | May 26, 1908 |
| 2,503,361 | Studebaker | Apr. 11, 1950 |
| 2,642,343 | Studebaker | June 16, 1953 |